United States Patent
Rancour et al.

(10) Patent No.: US 6,757,135 B2
(45) Date of Patent: Jun. 29, 2004

(54) LEADING EDGE BOND PADS

(75) Inventors: Michael Louis Rancour, Minnetonka, MN (US); Ralph Kevin Smith, Eden Prairie, MN (US); Kevin Jon Schulz, Apple Valley, MN (US)

(73) Assignee: Seagate Technology LLC, Scotts Valley, CA (US)

(*) Notice: Subject to any disclaimer, the term of this patent is extended or adjusted under 35 U.S.C. 154(b) by 103 days.

(21) Appl. No.: 09/912,996

(22) Filed: Jul. 25, 2001

(65) Prior Publication Data

US 2002/0012198 A1 Jan. 31, 2002

Related U.S. Application Data

(60) Provisional application No. 60/221,853, filed on Jul. 28, 2000.

(51) Int. Cl.[7] .......................... G11B 21/21; G11B 17/32; G11B 5/60
(52) U.S. Cl. .................................. 360/234.6; 360/234.5
(58) Field of Search ........................ 360/234.5, 234.6, 360/235.6, 235.7, 236.4, 236.5

(56) References Cited

U.S. PATENT DOCUMENTS

| | | | |
|---|---|---|---|
| 4,761,699 A | 8/1988 | Ainslie et al. | 360/103 |
| 4,789,914 A | 12/1988 | Ainslie et al. | 360/103 |
| 5,068,759 A | 11/1991 | Matsuzaki | 360/103 |
| 5,530,604 A | 6/1996 | Pattanaik | 360/104 |
| 5,657,186 A | 8/1997 | Kudo et al. | 360/104 |
| 5,680,275 A | 10/1997 | Frater et al. | 360/104 |
| 5,696,651 A | 12/1997 | Endo et al. | 360/104 |
| 5,734,523 A | 3/1998 | Scheidecker et al. | 360/103 |
| 5,781,379 A * | 7/1998 | Erpelding et al. | 360/245.3 |
| 5,821,494 A | 10/1998 | Albrecht et al. | 219/121.64 |
| 5,850,320 A | 12/1998 | Warmka et al. | 360/104 |
| 5,889,636 A | 3/1999 | Arya et al. | 360/104 |
| 5,896,248 A | 4/1999 | Hanrahan et al. | 360/104 |
| 6,002,550 A * | 12/1999 | Amemiya et al. | 360/234.5 |
| 6,184,475 B1 * | 2/2001 | Kitajima et al. | 174/260 |
| 6,188,546 B1 * | 2/2001 | Nakajima et al. | 360/234.5 |
| 6,349,017 B1 * | 2/2002 | Schott | 360/234.6 |
| 6,351,353 B1 * | 2/2002 | Sluzewski et al. | 360/294.3 |

FOREIGN PATENT DOCUMENTS

JP            02244419 A  *  9/1990  ............ G11B/5/60

* cited by examiner

Primary Examiner—William Klimowicz
(74) Attorney, Agent, or Firm—Merchant & Gould P.C.

(57) ABSTRACT

The invention is a suspension gimbal-head assembly that includes a magnetic head having a leading edge and a following edge, a suspension gimbal, the magnetic head is mechanically connected to the suspension gimbal at the head leading edge and the head following edge. There is also provided a disk drive that includes a suspension gimbal-head assembly that includes a magnetic head having a leading edge and a following edge, a suspension gimbal, the magnetic head mechanically connected to the suspension gimbal at the head leading edge and the head following edge.

16 Claims, 4 Drawing Sheets

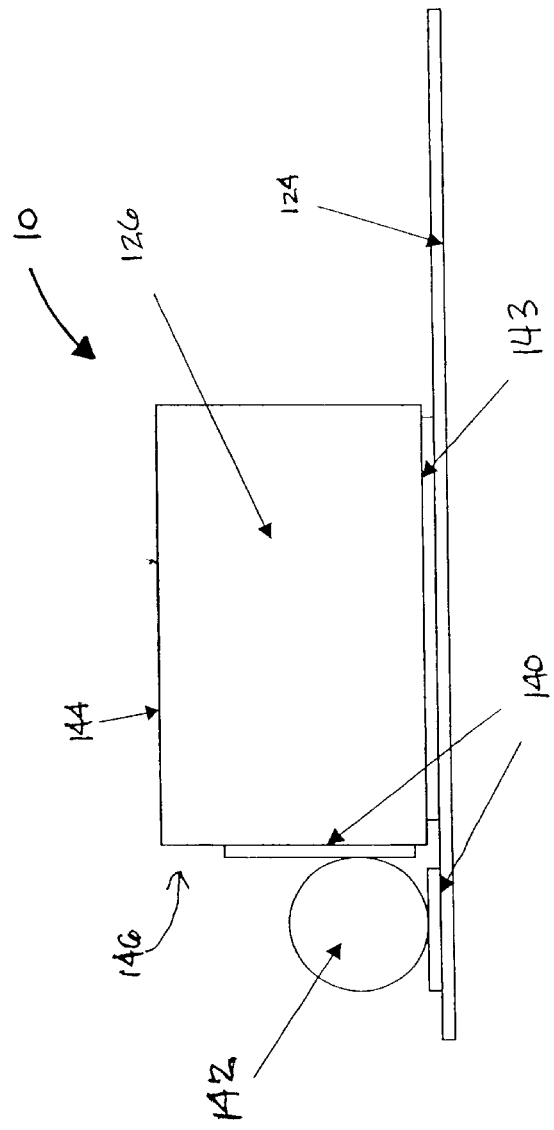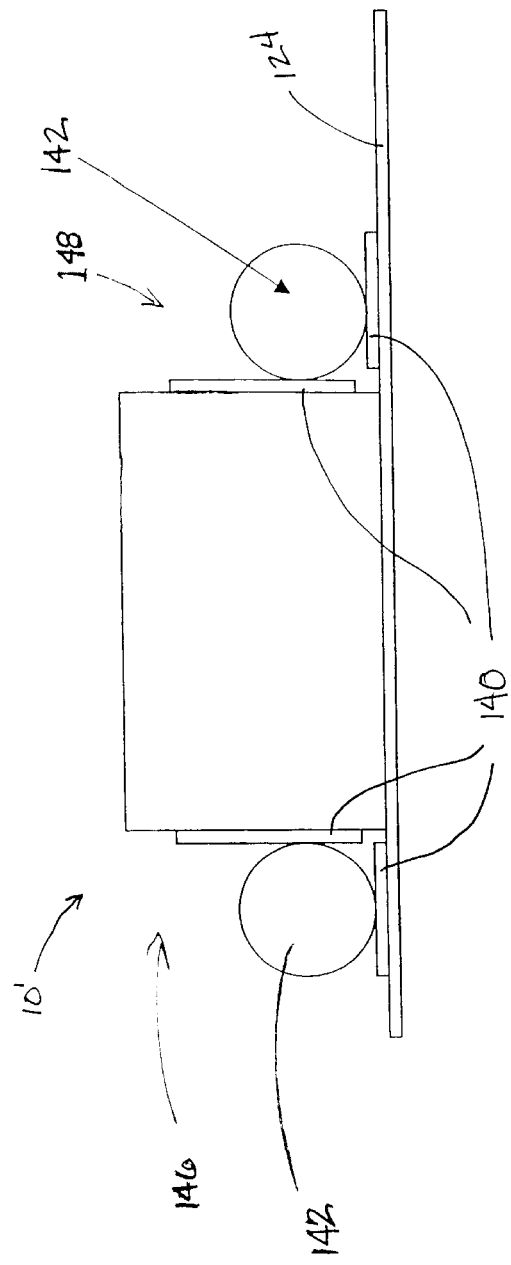

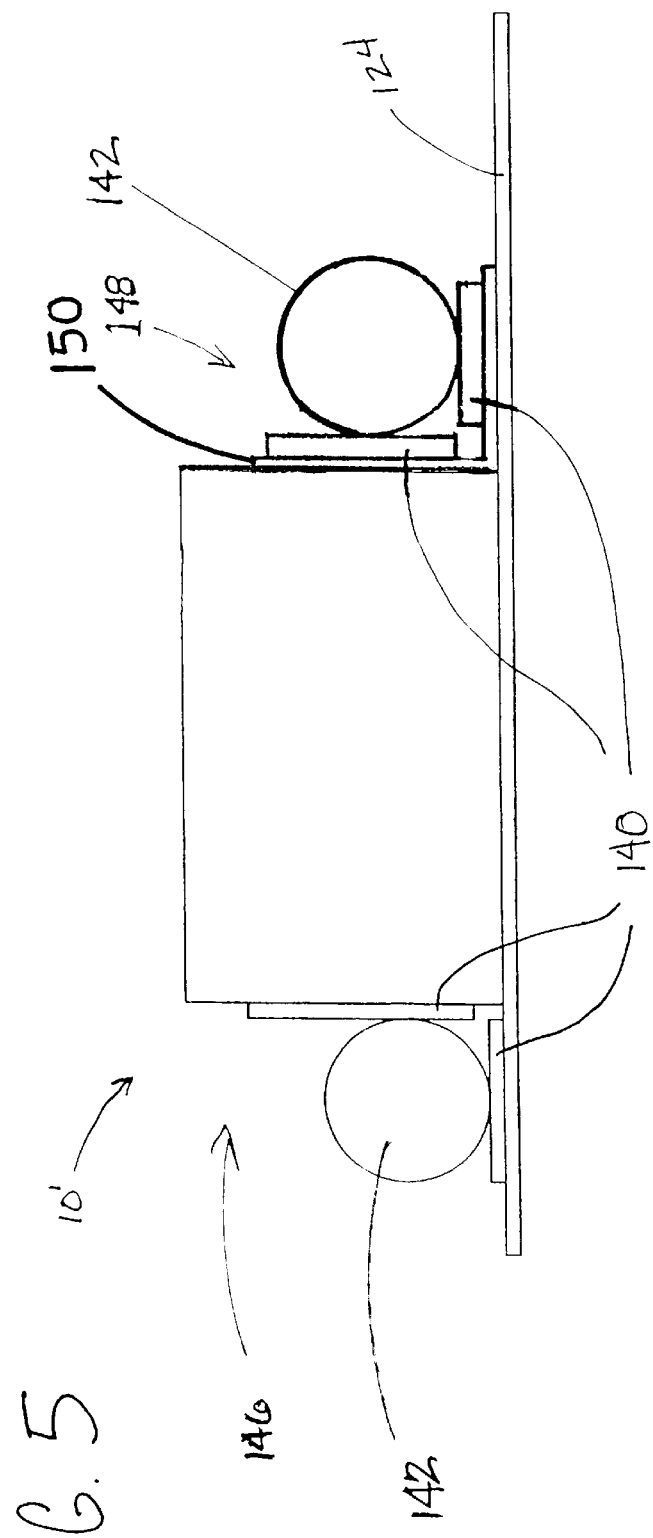

LEADING EDGE BOND PADS

This application claims priority to U.S. Provisional Application Serial No. 60/221,853, filed on Jul. 28, 2000, entitled Head Assembly Suspension Assembly and Method For Attaching Head Assembly to Suspension, the disclosure of which is incorporated by reference herein in its entirety.

FIELD OF THE INVENTION

The invention relates generally to disk drives and the components thereof. More specifically, the invention relates to methods for the attachment of magnetic recording heads to disk drives using only one type of connection technology for both mechanical and electrical connections.

BACKGROUND OF THE INVENTION

Assembly of the various component parts of any disk drive can be a complex task. Concerns such as mechanical and electrical integrity are often at issue. Disk drive components must be assembled to withstand extreme operating conditions such as high temperature and mechanical stress. Even still, the economic pressures on this technology also require that drives be assembled in a manner that is both efficient and affordable.

One critical element of the disk drive is the magnetic recording head. Without the head, the drive cannot read from, or write to, magnetic media. At the same time, the design of the head embodies both mechanical and electrical criticalities. For example, the head has at least one surface that is patterned and contoured to float above the disk. Additionally, the head must have the necessary electrical integrity to process the subject information.

In the past, disk drive assembly has relied upon adhesives to attach the top (opposite the air bearing surface) of the head to the suspension and solder or metal balls to electrically connect the end bond pads. Other systems used bond pads on the top surface to provide electrical and mechanical connections, but did not use leading edge pads. One example of such magnetic head assembly configuration is Kudo et al., U.S. Pat. No. 5,657,186. Kudo et al. disclose the use of gold contact balls to connect terminals and electrodes between the head assembly and the substrate.

Similarly, Endo et al., U.S. Pat. No. 5,696,651 teaches the use of gold to make electrical connections between the thin film head element and the suspension. Scheidecker et al, U.S. Pat. No. 5,734,523, also discloses the combined use of adhesive to attach the head assembly to the suspension arm and various solders to complete electrical connections. Arya et al., U.S. Pat. No. 5,889,636, discloses a similar system of head assembly attachment using both solder wire bumping and adhesive to attach solder to tongue. Frater et al., U.S. Pat. No. 5,680,275, discloses the use of solder as a form of attachment and as a spacer between the head assembly and the suspending arm.

However, the use of adhesives or a combination of adhesives and solder can make for a complicated system of assembly. As a result, there is a need for a simpler manner of forming the mechanical and electrical connections between the head and suspension.

SUMMARY OF THE INVENTION

In accordance with one aspect of the invention there is provided a suspension gimbal-head assembly that includes a magnetic head, having a leading edge and a following edge that is mechanically connected to the suspension gimbal at the head leading edge and the head following edge.

In accordance with another aspect of the invention there is provided a disk drive that includes a suspension gimbal-head assembly that includes a magnetic head having a leading edge and a following edge, a suspension gimbal, the magnetic head electrically connected to the suspension gimbal at the head leading edge and the head following edge.

Magnetic recording heads and suspension gimbals are assembled using a novel system that includes leading edge bond pads and corresponding bond pads on the suspension assembly. This differs from prior systems by allowing a common connection technology to be used for mechanical and electrical connections between the head and the suspension without the need for top bond pads.

Further, the invention allows the use of solders or metal contact balls avoiding the use of conductive adhesives. Conductive adhesives do not provide the same level of conductivity as metal contact balls or solder. The invention also provides better connection to ground, avoiding floating charges. The solder connections also allow easier reworking unlike adhesives, which often require chemical dissolution.

BRIEF DESCRIPTION OF THE DRAWINGS

FIG. 3 is an inverted side elevation of a suspension gimbal-magnetic head assembly.

FIG. 4 is an inverted side elevation of a suspension gimbal-magnetic head assembly in accordance with one embodiment of the invention.

FIG. 5 is an inverted side elevation of a suspension gimbal-head assembly including an insulating layer in accordance with a further embodiment of the invention.

DETAILED DESCRIPTION OF THE PREFERRED EMBODIMENT

The invention described in this application is useful with all mechanical configurations of disk drives having either rotary or linear actuation. In addition, the invention is also useful in all types of disk drives including hard disk drives, zip drives, floppy disk drives and any other type of drives where unloading the transducer from a surface and parking the transducer may be desirable.

Figure 1:
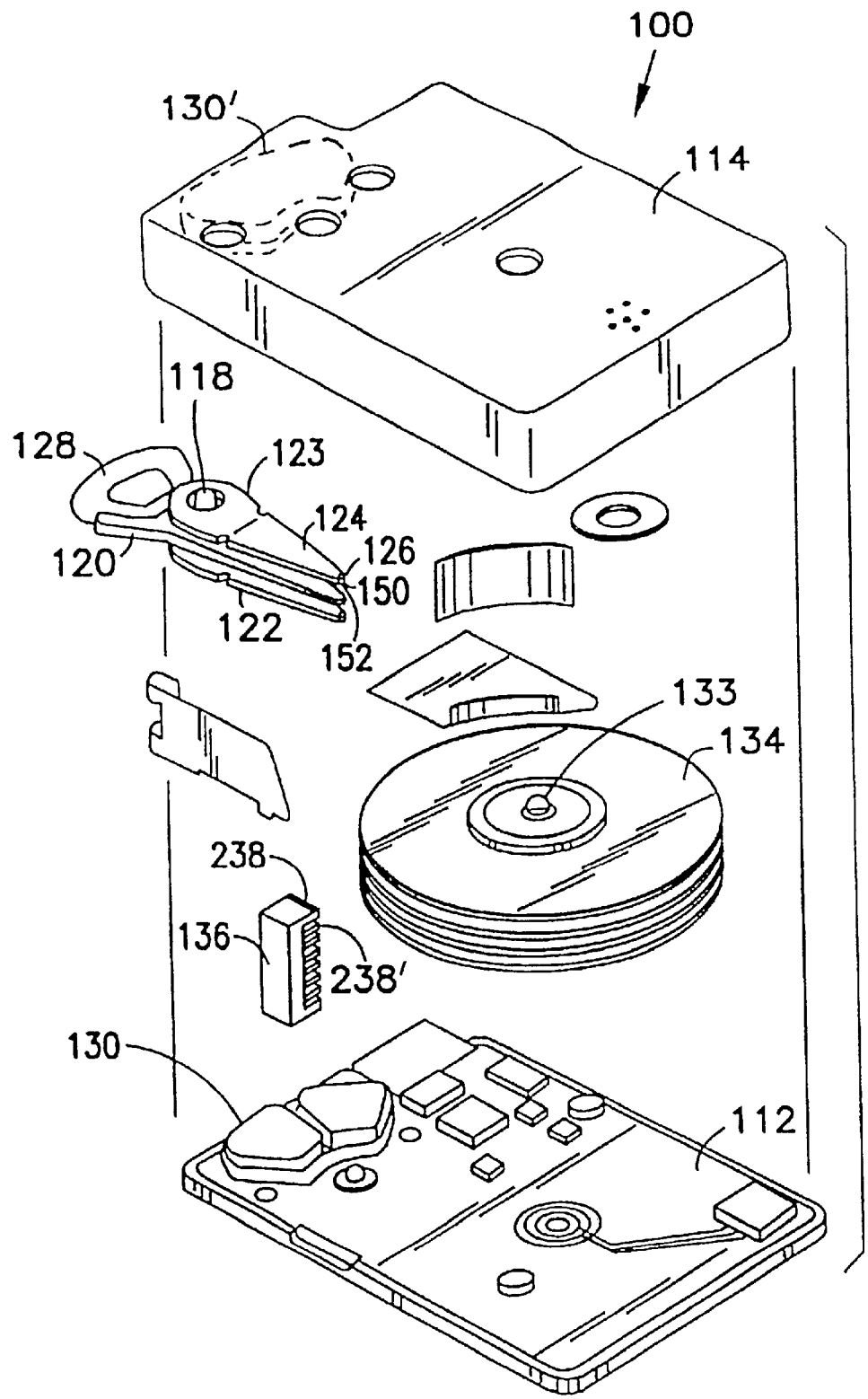
FIG. 1 is an exploded perspective view of a hard disk drive.

FIG. 1 is an exploded view of one type of a disk drive 100 having a rotary actuator. The disk drive 100 includes a housing or base 112, and a cover 114. The base 112 and cover 114 form a disk enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are suspension gimbal 124. Suspension gimbals can also be referred to as load beams or load springs. Attached at the end of each suspension gimbal 124 is a magnetic head 126 which carries a magnetic transducer 150.

The magnetic head 126 with the transducer 150 form is often referred to as the head assembly. It should be noted that many magnetic heads 126 have one transducer 150, but may have more than one, such as those referred to as an MR or magneto resistive head in which one transducer 150 is generally used for reading and another is generally used for writing.

Some magnetic heads 126 alternatively have a load tang 152. The load tang 152 is used for loading the magnetic head 126 to the disk 134 and unloading the magnetic head 126 from the disk 134. On the end of the actuator arm assembly 120 opposite the suspension gimbals 124 and the magnetic head 126 is a voice coil 128. Both types of magnetic heads 126, with or without load tang 152, can be used in accordance with the invention.

Attached within the base 112 is a pair of magnets 130 and 130'. The pair of magnets 130 and 130', and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disk drive 100, the spindle motor is within the spindle hub 133. In FIG. 1, a number of disks 134 are attached to the spindle hub 133. In other disk drives 100 a single disk or a different number of disks may be attached to the spindle hub 133. The invention described herein is equally applicable to such other disk drives.

Figure 2:
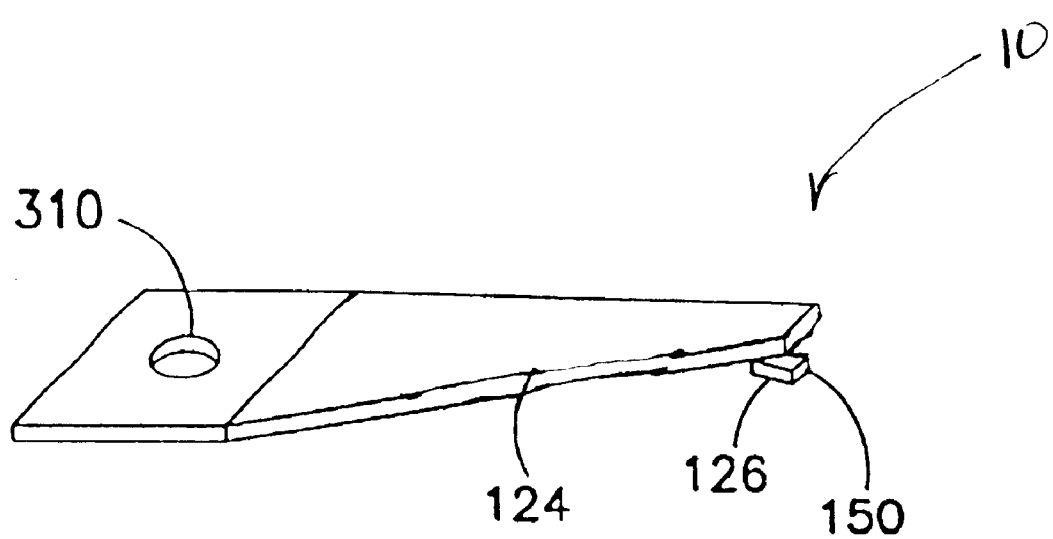
FIG. 2 is a perspective view of a suspension gimbal and magnetic head.

FIG. 2 is a perspective view of a suspension gimbal-head assembly 10. The suspension gimbal 124 is a triangular structure which acts as a cantilevered spring to place a small load onto the magnetic head 126 when the magnetic head 126 is in a transducing relationship with the disk 134. The suspension gimbal 124 is attached at its wider end to an actuator arm 123. The suspension gimbal 124 shown in FIG. 2 has a swage opening 310 and a swage plate (not shown) at the wider end of the suspension gimbal 124. The swage opening 310 and swage plate are used to attach the suspension gimbal 124 through a process referred to as swaging. Other attachment methods may also be used without departing from the spirit of this invention.

FIG. 3 is an inverted side elevation of a conventional suspension gimbal-head assembly 10. As the suspension gimbal-head assembly 10 is inverted the air bearing surface 144 of magnetic head 126 is directed upwards. Bond pads 140 may be seen on the following 146 edge of the magnetic head 126. A ball 142 is used to make electrical contact between the magnetic head 126 and the suspension gimbal 124. Ball 142 generally comprises gold, but solder may also be employed. An adhesive layer 143 is used to mechanically secure the magnetic head 126 to the suspension gimbal 124.

FIG. 4 depicts a suspension gimbal-head assembly 10' in accordance with the invention. In suspension gimbal-head assemblies 10' of the invention, the magnetic head 126 is connected to the suspension gimbal 124 by leading 148 edge contact ball 142 bonds as well as following 146 edge contact ball 142 bonds. Bond pads 140 are formed on the leading 148 edge as well as the following 146 edge of the magnetic head 126. A contact ball 142 is then used to mechanically secure the magnetic head 126 and the suspension gimbal 124 at the leading 148 edge of the magnetic head 126. Because there is a contact ball 142 on the following 146 and leading 148 edge, adhesive layer 143 between the head assembly 126 and suspension gimbal 124 is not necessary to mechanically secure magnetic head 126 to suspension gimbal 124.

The size of contact balls 142 depend in part on the size of bond pads 140. Generally, suspension gimbal-head assemblies 10' of the invention have bond pads 140 with widths of from about 4/1000 inch to 5/1000 inch (0.10 to 0.12 mm). The height of the bond pads 140 are generally from about 4/1000 inch to 6/1000 inch (0.10 to 0.15 mm) Generally, contact balls 142 utilized in the invention have diameters that are about equal to the dimensions of the bond pads 140. This relationship maximizes the contact area between the bond pads 140 and the contact balls 142 which enhances the mechanical and/or electrical contact between the contact ball 142 and bond pads 140.

In one embodiment of the invention, contact ball 142 at the leading 148 edge of magnetic head 126 can also be utilized to provide electrical contact between magnetic head 126 and suspension gimbal 124. The electrical contact can be utilized as a source of electricity or to ground the magnetic head 126. Preferably, the electrical contact made in this manner is utilized to ground magnetic head 126. Contact ball 142 generally comprises a conductive material. Contact balls 142 utilized in the invention comprise metals, solder, or combinations thereof. Metals utilized for contact balls 142 include those known to skill in the art, an example of which is gold. Solders utilized for contact balls 142 include those known to skill in the art, examples of which include eutectic solder, lead free solder, and low temperature lead free solders. Specific examples of compositions of solder that can be utilized in the invention include but are not limited to 58% Bi-42% Sn, and 63% Sn-37% Pb. Preferably, if a solder is used, it is a lead free solder.

In another embodiment of the invention, seen in FIG. 5, the leading 148 edge bond pad 140 and contact ball 142 mechanically secure the magnetic head 126 to the suspension gimbal 124 but do not provide electrical contact. This embodiment of the invention adds an insulating layer 150 below the contact pads 140.

Insulating layer 150 can comprise any insulating material. Examples of such insulating materials include but are not limited to insulating ceramics, insulating oxides, or insulating nitrides. A more specific example includes but is not limited to $Al_2O_3$.

It is preferred in both embodiments of the invention that the contact balls 142 comprise solder. Solder is preferred because once reflowed, it often provides better mechanical attachment between the magnetic head 126 and the suspension gimbal 124 than metal balls would.

Fabrication of the suspension gimbal-head assembly 10' may be completed by any number of means known to those of skill in the art. One method of attaching the magnetic head 126 and suspension gimbal 124 includes inverting and orienting the suspension gimbal 124 about 45° relative to horizontal. Solder or metal contact balls 142 may then be used to attach the magnetic head 126 at the leading 148 and following 146 edges of the magnetic head 126.

Solder and metal contact balls 142 are generally the approximate size of the bond pads 140. Generally, therefore, finished contact balls 142 are from about 4/1000 inch to 6/1000 inch (0.10 to 0.15 mm). If contact balls 142 comprise metal, gold for example, the gold ball is generally produced with a diameter that is substantially equal to the width of the contact pad 140. Methods of forming metal contact balls 142 are known to those of skill in the art. One such method includes ultrasonic bonding. In this method, the metal ball is formed on the bond pad 140, and pressure is applied to the ball along with ultrasonic vibration.

Another method of forming the contact ball 142 includes flowing the material for the contact ball 142 down a capillary element, usually made from a ceramic material, to the bond pad 140. Once the material is set against the bond pad 140, the contact area may be scrubbed as necessary. If the material is solder, a laser may be used to reflow the solder, or introduce flux into the system and reflow the entire system by putting it through a reflow oven for example.

The above specification, examples and data provide a complete description of the manufacture and use of the composition of the invention. Since many embodiments of the invention can be made without departing from the spirit and scope of the invention, the invention resides in the claims hereinafter appended.

The claimed invention is:

1. A suspension gimbal-head assembly, comprising:

a magnetic head having a leading edge, a following edge, a first plurality of bond pads on said leading edge and a second plurality of bond pads on said following edge, and a suspension gimbal, wherein said magnetic head is mechanically connected to said suspension gimbal at said leading edge and said following edge using said first and second plurality of bond pads, an insulating layer is included between at least one of said bond pads and said magnetic head, and said leading edge and said following edge are each defined as including a surface generally orthogonal to an air bearing surface of the magnetic head.

2. The assembly of claim 1, wherein said bond pads comprise gold.

3. The assembly of claim 1, wherein said magnetic head is also electrically connected to said suspension gimbal at said leading edge and said following edge using at least one of said first plurality of bond pads and at least one of said second plurality of bond pads, wherein said electrical connection bond pads do not include said insulating layer between said electrical connection bond pads and said magnetic head.

4. The assembly of claim 3, wherein the electrical connection between said magnetic head leading edge and said suspension gimbal comprises solder.

5. The assembly of claim 4, wherein said solder is free of lead.

6. The assembly of claim 3, wherein the electrical connection between said magnetic head leading edge and said suspension gimbal comprises metal contact balls.

7. The assembly of claim 6, wherein the electrical connection between said magnetic head leading edge and said suspension gimbal comprises gold contact balls.

8. The assembly of claim 1, wherein said insulating layer comprises $Al_2O_3$.

9. A disk drive comprising a suspension gimbal-head assembly comprising: a magnetic head having a leading edge, a following edge, and bond pads on said head leading edge and said head following edge; a suspension gimbal, said magnetic head mechanically connected to said suspension gimbal at said head leading edge and said head following edge using said bond pads, and wherein an insulating layer is located between at least one of said bond pads and said magnetic head and said leading edge and said following edge are each defined as including a surface generally orthogonal to an air bearing surface of the magnetic head.

10. The disk drive of claim 9, wherein said magnetic head is also electrically connected to said suspension gimbal at one of said leading edge and said following edge.

11. The disk drive of claim 10, wherein the electrical connection between said magnetic head leading edge and said suspension gimbal comprises solder.

12. The disk drive of claim 11, wherein said solder is free of lead.

13. The disk drive of claim 10, wherein the electrical connection between said magnetic head leading edge and said suspension gimbal comprises metal contact balls.

14. The disk drive of claim 13, wherein the electrical connection between said magnetic head leading edge and said suspension gimbal comprises gold contact balls.

15. The disk drive of claim 9, wherein said insulating layer comprises $Al_2O_3$.

16. A suspension gimbal-head assembly comprising:

magnetic head means comprising a leading edge, said leading edge including a surface generally orthogonal to an air bearing surface of said magnetic head means, and having a plurality of bond pads on said leading edge; and suspension-gimbal means;

wherein said magnetic head means is mechanically connected to said suspension gimbal means at said leading edge of said magnetic head means via said bond pads, and wherein an insulating layer is located between at least one of said bond pads and said magnetic head means to electrically isolate said magnetic head means.

* * * * *